May 18, 1965   K. F. BLINDENBACHER ETAL   3,184,268
AUXILIARY TRACTION DEVICE FOR VEHICLES
Filed Nov. 6, 1963   2 Sheets-Sheet 1

INVENTORS.
KENNETH F. BLINDENBACHER
PAUL A. REIHMANN
BY

ATTORNEY

INVENTORS.
KENNETH F. BLINDENBACHER
PAUL A. REIHMANN

ATTORNEY

United States Patent Office 3,184,268
Patented May 18, 1965

3,184,268
AUXILIARY TRACTION DEVICE FOR VEHICLES
Kenneth F. Blindenbacher, 325 W. Maple Ave., Merchantville, N.J., and Paul A. Reihmann, 6529 Collins Ave., Pennsauken, N.J.
Filed Nov. 6, 1963, Ser. No. 321,774
9 Claims. (Cl. 301—39)

This invention relates to an auxiliary traction device for the drive wheels of a vehicle.

An object of the invention is to provide such a device which may be quickly and easily applied for use to the drive wheels of a motor vehicle.

Another object of the invention is to provide such a device which may be brought from an inactive or reserve position to one of action without stopping the travel of a motor vehicle.

A further object of the invention is to make available a device capable of exerting a better thrust in deep snow and an apparatus for this purpose which is capable of being quickly applied and made active from the driver's seat as well as capable of being quickly withdrawn from action from the same seat without having to stop the driven vehicle.

There has long been a need for some quickly applicable mud or snow tread for a vehicle drive wheel which may be both applied and removed when passing from bare road surface into snow covered or muddy roads, and vice versa. Tire chains cannot be put on without a delay in stopping the vehicle, to put them on and take them off, and in addition they aggravate wear on the tread of the tire. Also when passing along roads bare of snow these chains cause objectionable vibration and preclude as rapid a vehicle travel as might otherwise be desired. Snow tires are best for going from bare roads to those with not heavy snow on them, but tire chains are better for deeper snow. The present invention is better adapted for use in deeper snows and also when going from bare roads to roads or other locations having soft mud in patches or even in extended lengths. In brief this invention possesses the advantages of both tire chains and snow tires without the inherent disadvantages of each of them.

Specifically the present invention provides an interrupted wheel adjacent each drive wheel on the laterally inner side thereof but which is provided with a number of expansible elements capable of being moved radially outward under fluid pressure an amount to bring outer end portions of these elements beyond the tire tread surface, and locked, so that these elements may withstand a large part of the weight on a drive wheel, dig into deep snow or mud and provide a better thrust than either a tire chain or snow tire is capable of exerting. When the vehicle reaches a part of the road where there is little or no snow or mud these elements can then be unlocked from the driver's seat when springs retract them radially inward to an amount allowing the tire treads only to contact the road surface.

Other objects and advantageous features of the invention will be apparent from the description and claims.

The nature and characteristic features of the invention will be more readily understood from the following description taken in connection with the accompanying drawings forming part thereof, in which.

Figure 4:
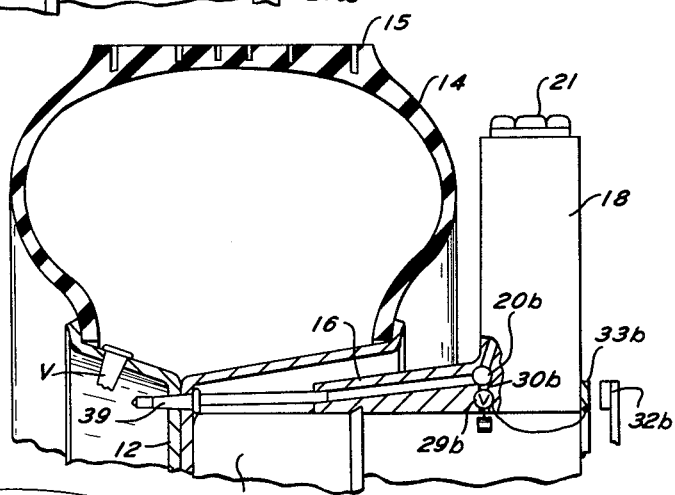
Figure 5:
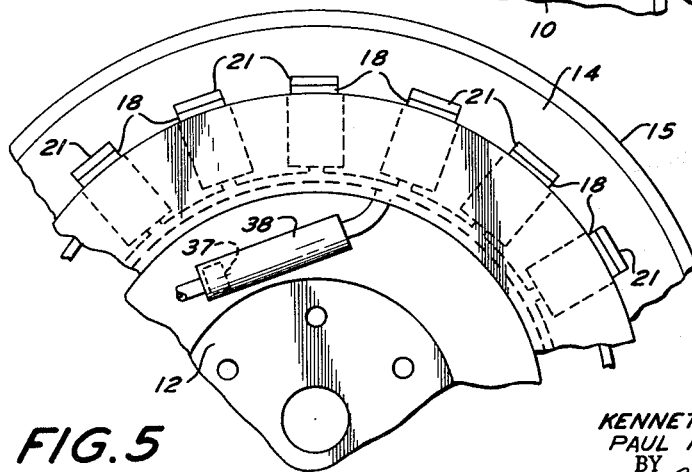

FIG. 4 exemplifies in partial section still another embodiment of this invention, some of the parts being shown diagrammatically; and FIG. 5 illustrates an outer side view of a driving wheel showing the interrupted wheel elements in dotted lines.

It should, of course, be understood that the description and drawings herein are illustrative merely, and that various modifications and changes can be made in the structure disclosed without departing from the spirit of the invention.

Like numerals refer to like parts throughout the several views.

Figure 1:
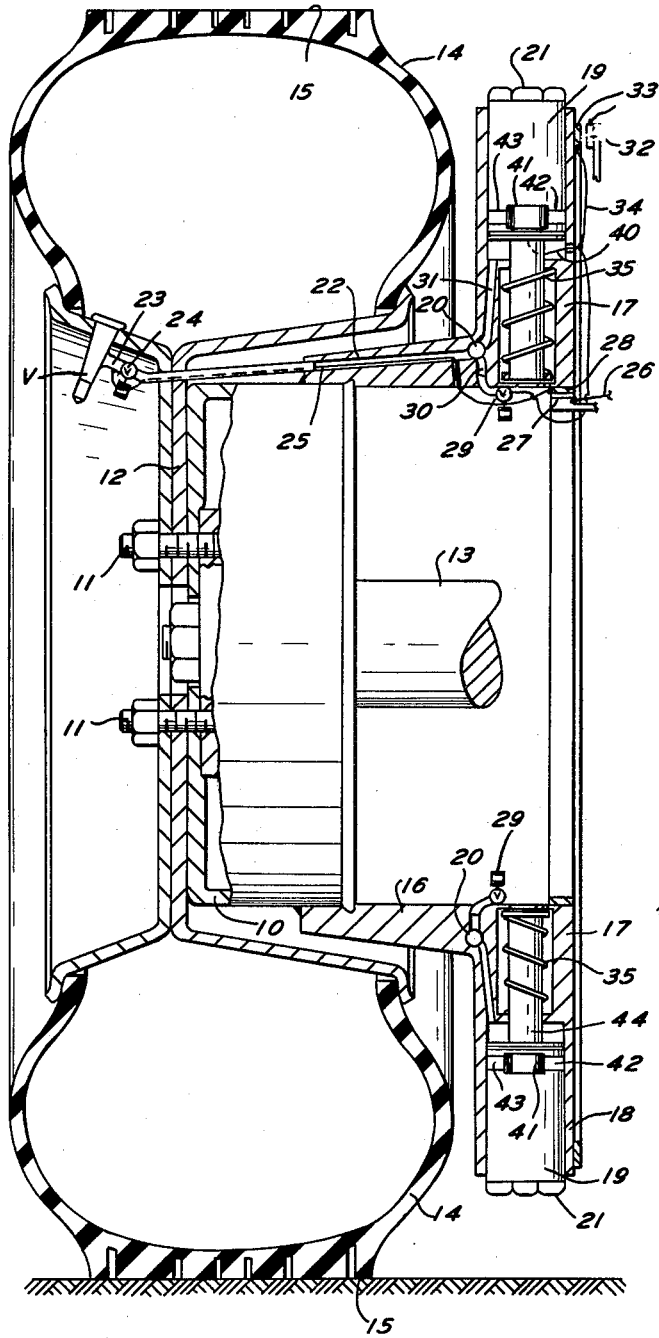
FIGURE 1 is a transverse partial section through a driving wheel to which an embodiment of this invention has been applied with the expansible elements retracted, some of the parts being shown diagrammatically.
Figure 2:
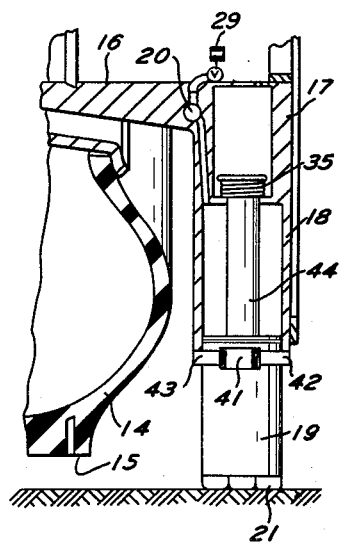
FIG. 2 is a partial wheel section as in FIG. 1 but with one of the expansible elements fully extended to possess greater traction in this interrupted wheel than is possessed by the usual tire.

Referring now more particularly to the drawings, in FIG. 1 the brake drum housing or cooling drum 10 is shown as being secured by bolts 11 to the drive wheel 12 in a usual manner from the axle 13. A usual tubeless tire 14 has the customary tread 15 contacting the road. A reinforcement 16 for the cylindrical housing 10 constitutes a support for the interrupted wheel 17 shown in dotted lines in FIG. 4 as comprising about sixteen or more projections 18, each containing an element 19 capable of being moved radially outward under fluid pressure to an extent as shown in FIG. 2. These elements are each constituted by a piston 19 slidable within a cylindrical projection 18 and all the pistons 19 are movable together. FIGS. 1 and 2 illustrate the extreme positions for these pistons 19.

A fluid pressure header 20 extends for 360 degrees for supplying pressure to each cylindrical projection 18 and its piston 19. The outer end of each piston 19 is provided with a shoe 21 for contact with the road, mud or snow surface. When fully extended the front and rear driving thrust on the pistons 19 has to be sufficient to force the vehicle through mud or deep snow and the side walls of each cylindrical projection 18 must serve to withstand such thrusts on the pistons 19 and to guide them. Such side walls will provide additional traction in depth.

A passageway 22 leads from header 20 to a suitable source of fluid pressure. In FIG. 1 this passageway 22 extends to a valve passageway 23 and joins that passageway between the tire valve V and the air inside the tire. A valve construction like that shown in Rockman Patent No. 2,012,773 could be readily adapted for this purpose. A solenoid operated valve 24 in passageway 22 is controlled by current through the wire 25 leading to the instrument panel adjacent the driver's seat. A typical solenoid valve suitable for such use is shown in McClure Patent No. 2,404,514. A stationary conductor 26 from such instrument panel connects with the wire 25 in the rotating interrupted wheel 17 through a conductive brush 27 wiping a rotating conductor ring 28 insulated from but fixed to the wheel 12.

Another solenoid operated valve 29 when actuated by the driver vents air pressure in the header 20 when desired and is on the radial inner side of the reinforcement 16, a passageway 30 leading to the valve 29 from the header 20. A passageway 31 leads from the header 20 to the radial inner side of each piston 19. A stationary conductor brush and wire 32 has a sliding or wiping contact with a conductor ring 33 secured to but insulated from the interrupted wheel and its cylinders 18 and pistons 19. A conductor 34 connects the ring 33 with the vent valve 29. Springs 35 are compressed by fluid pressure forcing pistons 19 radially outward and are expanded on release of pressure by the vent valve 29. Each spring 35 retracts its piston 19 moving shoe 21 radially inward an amount to cause the tire tread 15 to take the portion of the weight of the vehicle that this tire should take and the pistons 19 no longer bear any of the vehicle weight. Each of the drive wheels 12 has an interrupted wheel of the character described secured to it for better traction in deeper snow.

In operation, when a motor vehicle gets into snow or mud in which the drive wheels do not possess adequate traction, the driver closes a switch (not shown) sending current through wire 26, brush 27, conductor ring 28, and wire 25, actuating each solenoid valve 24 opening these valves 24 and thus allowing, when the valve 24 is opened, the entire pressure within the tire to be brought to bear on the pistons 19 via the circular header 20. This will slightly reduce the pressure within the tire, as air pressure from tire 14 will pass through passageway 23, valve 24, and passageway 22 to the circular header 20. The usual tire valve V for filling the tire 14 is external to or radially inside the junction of passageway 23 and 22 and is not affected by the drawing off of pressure from the tire 14. Likewise, when filling the tire 14 through the usual valve V, the valve 24 is normally closed. From the circular header 20 gas pressure flows radially outward through passageway 31 to the radial inner side of each piston 19 causing it to move radially outward, compressing its spring 35 and moving the shoe 21 on each piston radially outward far enough to cause these shoes 21 to dig into the snow and provide the needed traction.

FIG. 2 shows a piston and shoe in their outward position.

On closing a switch to deliver air pressure into the header 20, the piston 19 not then bearing a portion of the vehicle weight will move outward far enough until locked. As the wheel 12 rotates the piston 19 which have become locked will bear their portion of the vehicle weight and those which were in a position to do so had the fluid pressure been greater will become locked as the wheel rotates. Any well known type solenoid type lock may hold the pistons 19 in their extended positions.

The wire 40 branching from wire 34, leads through a usual insulating bushing (not shown) in the wall of cylindrical projection 18 and into the tubular rod 44 mechanically connected to the piston 19 and wire 40 electrically connected to a solenoid (not shown) within the axial tube 41. When current is passed through wire 34 and 41 activating this lock releasing solenoid in axial tube 41 the arms 42 and 43 are retracted radially inward of each cylindrical projection 18 releasing these locking arms 42 and 43 from the upper ends of projections 18 and allowing spring 35 to expand moving the piston 19 radially inward of the interrupted wheel for carrying the vehicle on the tire 14 on a relatively clear road surface. At the same time that the locking arms 42 and 43 are released the vent valve 29 is opened to release fluid pressure on the piston and better enable spring 35 to move the piston 19 inward of wheel 17. While only one supply wire is shown for the several circuits, the opposite end is grounded to the vehicle frame as is the usual practice in automobile wiring. For moving arms 42 and 43 outward a spring (not shown) therebetween normally presses these arms 42 and 43 outwardly but is prevented from moving these arms by the walls of cylindrical projection 18.

FIG. 2 shows the piston 19 extended for operation in mud or snow with the shoes 21 when locked capable of extending radially outwardly beyond the tire tread. It will be understood the brushes 27 and 32 may be normally in contact with their conductor rings 28 and 33 and the panel switches (not shown) near the driver, one of them controlling the circuit for moving the pistons 19 radially outwardly and the other controlling the circuits for piston retraction.

The brushes 27 and 32 may be normally out of contact with their rings 28 and 33 and may be brought into contact on closing the driver's switch and moved out of contact on venting pressure and releasing the piston lock in a manner familiar to those in the electrical switching art.

Figure 3:
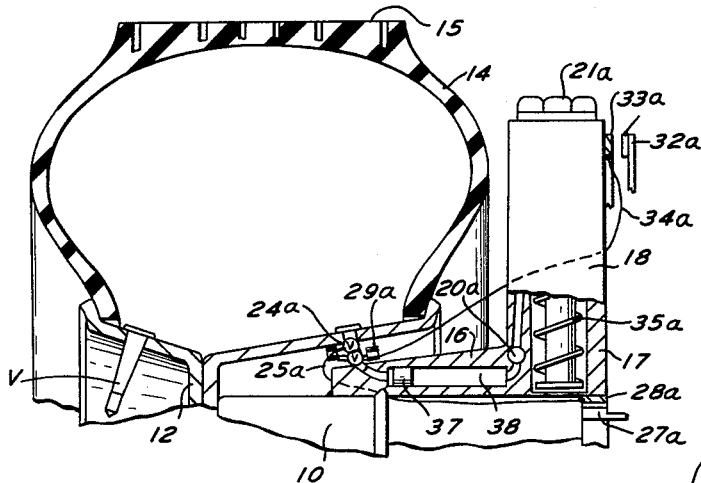
FIG. 3 is a partial section through another embodiment of this invention, some of the parts being shown diagrammatically.

The embodiment in FIG. 3 differs from that shown in FIGS. 1 and 2 in two principal particulars. The solenoid valve 24a for admitting tire pressure air to move the pistons 19 to an extended position is located in the rim of the wheel 12 and is not as near the tire filling valve 24 as in FIG. 1. The valve 24a as actuated by wire 25a from the wiping contacts 27a and 28a as before. The valve 29a for exhausting air pressure is now located between the rim 36 and the reinforcement 16a but is energized as before through a wire 34a from the wiping contacts 32 and 33a. An important difference resides in the air pressure actuating a piston 37 in a master hydraulic cylinder which supplies pressure fluid through the header 20a for actuating each piston with its shoe 21a. An advantage in this construction is the possession of the usual advantages with the use of such a hydraulic cylinder as is common for controlling brakes, but also it may be made to possess a mechanical advantage by having lower gas pressure operating a large area piston to control a higher hydraulic pressure for the header and pistons. A similar locking device is needed for the pistons used in FIG. 1.

An embodiment of this invention is shown in FIG. 4 when the necessity for using tire pressure is not present and instead it is necessary only to stop at a filling station to have air supplied or to carry a small container of an inert gas under higher than tire pressure. A filling valve 39 similar to those used with tires is adequate for supplying gas to the header 20b. A vent valve 29b is located in the passageway 30b near its outer end and the wiping contacts 32b and 33b are shown near the valve 29b since no switch actuated valve is needed for supplying fluid pressure to the pistons as the valve 39 needs none. However a wire (not shown) extends from contact 33b for unlocking the pistons 19 to permit of retracting them.

FIG. 5 is an outer side view of this invention showing the angular spacing of the cylinders in the interrupted wheel with the master cylinder of FIG. 3 located between the intake valve for the gas pressure and the ring type header. With this invention at least about a total of sixteen cylinders is preferred because less than this number will produce more vibration than is wanted. Of course a larger number of cylinders should make for smoother riding, but this tends to unduly increase the amount of air or gas to be supplied to actuate the pistons 19.

Instead of being carried from a support which is spaced from the tire rim, the herein cylinders 18 of the interrupted wheel could be fastened to the wheel rim and yet provide adequate clearance for changing a tire. Having the interrupted wheel cylinders 18 of larger diameter to obtain better traction with the extended pistons and shoes is desirable where greater clearance is provided with some automobile designs. Smoother riding is possible with the shoe on each piston of larger angular extent yet capable of forming a more nearly complete circle when the pistons 19 are retracted.

I claim:

1. In an axle driven wheel for a vehicle, said wheel having a metal rim and an inflatable tire carried on said rim and having a road engaging tread, the combination therewith of auxiliary driving equipment for use in mud or on snow covered roads, said equipment including a support secured to said wheel laterally thereof and provided with a plurality of angularly spaced radially disposed cylinders, each of said cylinders having therein a radially outwardly expansible element with a road engaging end portion movable radially beyond said tread of said tire, resilient members in each of said cylinders for retracting said expansible elements radially inwardly, fluid pressure control means for said cylinders for effecting outward movement of said expansible elements including a fluid connection to the interior of said tire for pressure delivery therefrom and a solenoid controlled valve in said fluid connection for controlling fluid pressure application therefrom, locking members for each of said expansible elements and having locking arms engageable with the respective cylinders for holding said expansible members in their outer positions, and members for retracting said locking arms.

2. A combination according to claim 1 in which said members for retracting said locking arms are solenoid operable to release said elements from an outward position.

3. A combination according to claim 1 in which said expansible elements when retracted are radially movable inward an amount to allow the wheel portion of a vehicle load to be borne by the tire and its tread but when expanded said elements bear a major portion of that wheel part of the vehicle load.

4. A combination according to claim 1 in which said fluid pressure control means includes an electrically controlled valve for venting fluid pressure from said cylinders.

5. A combination according to claim 1 in which a fluid pressure supply header extends around said support and is connected to each such cylinder for the supply of fluid pressure to its element.

6. A combination according to claim 1 in which a hydraulic unit actuated by air pressure is interposed between said solenoid controlled valve and said cylinders.

7. A combination according to claim 1 in which a common fluid pressure connection is provided for all expansible elements of the interrupted wheel, a master hydraulic cylinder provides pressure for said connection, and said hydraulic cylinder is controlled by fluid pressure from said first fluid connection.

8. A combination according to claim 1 in which said tire has an air inlet valve and said fluid connection is connected between said air inlet valve and the interior of said tire.

9. A combination according to claim 1 in which said tire has an air inlet valve, and said fluid connection is connected through said rim.

References Cited by the Examiner
UNITED STATES PATENTS

| | | | |
|---|---|---|---|
| 2,012,773 | 8/35 | Rockman | 152—415 |
| 2,177,042 | 10/39 | Michael | 301—41 X |
| 2,228,423 | 1/41 | Ticktin | 301—47 |
| 2,254,318 | 9/41 | Roessel | 301—47 |
| 2,452,688 | 11/48 | Schlett | 180—15 |
| 2,765,199 | 10/56 | Partin | 301—47 |
| 2,841,199 | 7/58 | Voelkel et al. | 152—415 X |

ARTHUR L. LA POINT, *Primary Examiner.*